Patented Dec. 7, 1937

2,101,704

UNITED STATES PATENT OFFICE 2,101,704

INSECTICIDAL COMPOSITION

Charles Dangelmajer, Niagara Falls, N. Y., assignor to The E. I. du Pont de Nemours & Company, Wilmington, Del., a corporation of Delaware No Drawing. Application May 26, 1934, Serial No. 727,721

15 Claims. (Cl. 167—16)

This invention relates to the preparation of materials having insecticidal or fungicidal properties and adapted to be used in liquid sprays for agricultural use and more particularly to the preparation of solid compositions adapted for the preparation of aqueous suspensions.

Water suspensions of a variety of insoluble or relatively insoluble materials are used as insecticides or fungicides for spraying plants. One of the chief difficulties encountered in spraying plants with water suspensions of insoluble insecticides or fungicides is the tendency of the solid materials to coagulate and to separate out before the bulk of the suspension can be sprayed. In order to prevent such change, it is common practice to add a water soluble protective colloid to the spray in order to minimize the coagulation and the settling out. It is preferable, however, to supply to the user a solid composition containing the protective colloid which composition may be suspended in water to form a relatively stable suspension, without requiring a further addition of effective colloids or other deflocculating agents. This insures that the proper kind and amount of protective colloid is present and makes possible the preparation of satisfactory suspensions by unskilled persons. A number of solid insecticidal compositions containing protective colloids or deflocculating agents have been proposed but these have not been fully satisfactory. Such materials are provided in two forms (a) as a paste or highly concentrated suspension and (b) as a pulverulent dry powder. The dry powdered materials are to be preferred because of their lighter weight per pound of effective ingredients which result in lower shipping costs. However, heretofore, the best results in general have been obtained by using a paste. Usually when such a paste is dried and powdered, the suspending properties of the resultant material are not as good as those of the original paste.

The difficulties encountered in obtaining stable suspensions of insecticides and fungicides vary widely, depending upon the nature of the insecticidal or fungicidal material; some substances form more stable suspensions than others. Cuprous cyanide (CuCN) may be mentioned as an example of an insoluble insecticide-fungicide which is unusually difficult to suspend in water to form a stable suspension. This material has a very low solubility in water and when freshly precipitated or finely pulverized, it occurs in the form of exceedingly fine particles having a great tendency to agglomerate to form larger particles which will rapidly settle out from water suspensions. The addition of a protective colloid to a water suspension made of dry, pulverulent CuCN consisting of coagulated particles does not decrease the tendency of the material to settle out to a practicable extent.

An object of this invention is to prepare a solid, pulverulent composition containing copper cyanide and a protective colloid which composition is readily suspended in water to form a relatively stable suspension. A further object is to provide a means of incorporating colloidal deflocculating agents into insoluble insecticidal and fungicidal material to prepare compositions to be used for preparing water suspensions. My invention also includes a novel copper cyanide insecticidal material as hereinafter described. Other objects of my invention will be apparent from the following description.

I have discovered a novel method of incorporating protective colloids or deflocculating agents in solid, water insoluble insecticidal or fungicidal materials by which method may be produced a solid, finely divided copper cyanide composition which is readily suspended in water to produce a highly stable suspension. Briefly, this method comprises first reacting a soluble cuprous salt with a soluble cyanide to precipitate copper cyanide in the presence of a small amount of finely divided, substantially insoluble and chemically inert, solid material. This precipitate of cuprous cyanide then is removed from the supernatant liquid washed with water and while it is yet in a moist state, a protective colloid or deflocculating agent is incorporated therein. The resulting paste-like material may be used directly to prepare a suspension suitable for spraying plants or first may be dried and ground to a fine powder and the resulting powder used to prepare a spray suspension. Either the paste or the powder form may be added to water to form a suspension having a high degree of stability.

Various modifications of the above described method are possible without departing from the spirit and scope of my invention. For example I may add some of the protective colloid to the solution from which the copper cyanide is precipitated, either before or during the precipitation step; this is not essential but is preferable in that it aids in wetting and suspending the solid, inert material which is present during the copper cyanide precipitation. In any case, it is essential that the protective colloid be incorporated in the copper cyanide precipitate after the latter has been separated from the solution in which it was formed and while it is yet in a moist state.

I have further discovered that the grinding of the resulting dried copper cyanide precipitate containing protective colloid may be facilitated by incorporating in the precipitate before drying a finely divided, insoluble material which is more or less fibrous or flocculent in nature and has a relatively low specific gravity due to its fibrous or flocculent nature. Asbestos fibres or a "fluffy" type of kieselguhr such as "Sil-O-Cel" are examples of materials which may be used for this purpose. Such materials may be mixed with the moist CuCN precipitate or preferably, are present when the CuCN is precipitated. In the latter case, they function as any finely divided inert material, namely to improve the suspending quality of the final product.

I am aware that protective colloids have been incorporated in insoluble insecticidal agents to increase their suspension properties in a variety of ways. I also am aware that the prior methods include the incorporation of the protective colloids before and during precipitation of an insecticide and to the precipitate after its separation from the liquid solution in which it was formed. My invention, however, differs from these prior methods in that the insecticide is precipitated in the presence of a finely divided, insoluble, chemically inert material, and thereafter a protective colloid is incorporated in the moist precipitate. My novel method results in distinctly improved results, especially when the precipitated material has a great tendency to coagulate, as is the case with cuprous cyanide. Cuprous cyanide apparently tends to precipitate in relatively large flakes. If various known methods are used to prevent the formation of large flakes during this precipitation, for example by rapid agitation of the solution and/or by precipitating in the presence of a protective colloid, smaller particles may be formed but these have a great tendency to agglomerate to form larger particles so that the resulting precipitate or a large part of it is then composed of relatively large particles which rapidly settle out from water suspensions. Precipitation of cuprous cyanide in accordance with my invention, that is in the presence of finely divided inert material, does not prevent the formation of large, relatively non-suspendable aggregates but it appears to cause such aggregates to form in a loosely-bound manner, so that they are more readily broken up and suspended by the action of a protective colloid. That is, the small particles which form the aggregates are only loosely held together and are more easily broken up than particles not precipitated in the presence of inert material. When the resulting moist precipitate containing such loosely bound aggregates is mixed with a concentrated solution of a protective colloid, by reason of the loosely-bound nature of the aggregate the colloid penetrates more easily into the submicroscopic interstices of the individual aggregates and hence has a highly deflocculating action. Conceivably the protective colloid could be added to the precipitate during or immediately after its formation but before its removal from the solution in which it was formed. However, this will not give the same results for two reasons: (a) the presence of electrolytic salts, e. g. NaCl, resulting from the precipitation reaction will tend to counteract the effect of the protective colloid and the electrolytes cannot easily be removed without also removing the colloid and (b) the amount of water present would cause the protective colloid to exist in a relatively low concentration with the result that only a relatively small part of the colloid would penetrate into the loosely-bound aggregates of crystalline particles, unless excessively large amounts of the colloid were used. The underlying principle of my invention, based on the above explanation, is first to precipitate CuCN in the presence of inert material with the result that any agglomerates formed are loosely bound and readily deflocculated and second, to incorporate a protective colloid with the precipitate under such conditions that the colloid is in form of a highly concentrated solution.

In practising my invention, various inert materials may be used as above described during the precipitation of the cuprous cyanide. The inert material used should be finely divided, e. g. not coarser than about 100 mesh, it should be at least relatively insoluble in water and should be substantially chemically inert to the chemicals present in the solution when the copper cyanide is precipitated. Various forms of finely divided carbon, e. g., lampblack, are suitable. Likewise, various finely divided mineral substances such as kaolin, ground asbestos or kieselguhr may be used.

The various known protective colloids or deflocculators suitable for stabilizing aqueous suspensions may be used in practicing my invention. The following may be mentioned as suitable materials: animal glue, goulac (waste sulfite liquor), malt extract, corn starch, molasses and gelatin.

By way of example, one method of practicing my invention to produce a solid cuprous cyanide composition suitable for preparing agricultural sprays will be described.

A solution of cuprous chloride in sodium chloride brine is prepared, to which is added a small amount of sodium bisulfite to maintain the cuprous ions in the reduced state and sufficient hydrochloric acid solution to make the solution distinctly acid. I prefer to adjust the acidity with respect to the alkalinity of the cyanide solution used to precipitate the CuCN, so that the mixture still remains slightly acid after the precipitation is completed. A small amount of lampblack then is mixed with sufficient black syrup molasses to form a heavy paste and this paste is added to the cuprous chloride solution with thorough agitation. It is also preferable at this time to thoroughly mix into the solution a small amount of rather finely divided, fluffy, or fibrous, insoluble and chemically inert material, to facilitate grinding the final product, as described above. For this purpose I may use a rather fibrous grade of kieselguhr, e. g. the material known as "Sil-O-Cel", or ground asbestos fibres. This fibrous material may be added either before or during precipitation of the copper cyanide. Sufficient soluble cyanide solution, e. g. a solution of sodium cyanide, then is added to the solution to precipitate substantially all of the copper present as cuprous cyanide. The precipitate of cuprous cyanide then is removed by filtration or decantation and is thoroughly washed with water, preferably until substantially all chloride ions have disappeared. The moist precipitate then is transferred to a suitable mixing device and thoroughly mixed with a small amount of a water soluble protective colloid material. The protective colloidal material may be added in the anhydrous state or it may first be dissolved in water or a water-miscible solvent to form a highly concentrated solution, paste or gel. I prefer to mix into the precipitate black strap molasses to serve as the protective colloid material. The resultant pasty mass then is dried, preferably at around 105° C. and the resultant dried material is ground to a fine powder, for example around 300 mesh size. The resultant powdered material is readily suspended in water to form a highly stable suspension suitable for agricultural spray purposes.

I have discovered that my above described process is suitable for the preparation of various insoluble insecticidal spray compositions which comprise materials which may be produced by precipitation from aqueous solution. For example my invention is applicable to the preparation of the so-called dry "Burgundy mixture" which comprises a mixture of basic copper sulfate and copper carbonate and also to the preparation of various insoluble arsenates e. g., lead aresnate.

My invention may be further illustrated by the following examples:

*Example 1*

A quantity of cuprous chloride dissolved in a sodium chloride solution was acidified with sufficient hydrochloric acid solution to bring the acid normality to 0.076 N. Sodium bisulfite was added to the solution in an amount equal to about 1 gram per liter, to maintain the cuprous salt in the reduced state. The cuprous chloride content of the resulting solution was equivalent to about 78 grams of copper per liter. A quantity of lampblack equivalent to about 0.4% of the weight of the copper in the solution was mixed with little more than its weight of molasses, together with a small amount of concentrated sodium chloride solution to form a thin paste and this paste was added to the cuprous chloride solution with vigorous agitation. At the same time a quantity of "Sil-O-Cel" grade of kieselguhr equivalent to about 3% by weight of the copper present was added to the solution and thoroughly stirred in. The theoretical quantity of sodium cyanide solution then was added with moderate stirring to precipitate cuprous cyanide. The mixture then was filtered and the precipitate was washed on the filter with hot water until tests showed that it was substantially free of dissolved chloride. The moist precipitate then was transferred to a paint mixing machine and a quantity of black strap molasses equivalent to about 5% by weight of the moist precipitate, was thoroughly mixed in. The resulting material, which was a thin paste, was dried in shallow pans at a temperature of about 105° C. The dried material then was ground and passed through a centrifugal air separator device to produce a material of about 300 mesh size. The ground product contained about 86% of cuprous cyanide and less than 0.25% of moisture.

A sample of cuprous cyanide was prepared by precipitation as above, except that no inert solid material was added before or during precipitation, so that the precipitate was substantially pure CuCN. After washing to remove substantially all soluble chlorides, the moist precipitate was thoroughly mixed with about 20% of its weight of black strap molasses, dried and ground to about 300 mesh size.

Water suspensions of the two products, each suspension containing about 2.7 grams per liter were made and the rate of settling of each was determined with the following results:

| Time | Percentage of suspended material settled out | |
|---|---|---|
| | Products precipitated with lampblack and "Sil-O-Cel" | Products precipitated in absence of inert material |
| *Minutes* | *Percent* | *Percent* |
| 4 | ---------- | 100 |
| 10 | 15 | 100 |
| 20 | 28 | 100 |
| 40 | 47 | 100 |
| 60 | 62 | 100 |
| 120 | 84 | 100 |
| 150 | 91 | 100 |

*Example 2*

A number of samples of dry, powdered cuprous cyanide compositions were made by precipitating cuprous cyanide from cuprous chloride solutions in the presence of various finely divided, insoluble, inert materials and incorporating various protective colloids with the moist precipitates, by the method described in Example 1. The following table lists the samples thus prepared and shows the inert material and protective colloid used in each case:

| Sample | Inert solid | Protective colloid |
|---|---|---|
| A | Lampblack | Molasses. |
| B | Lampblack and "Sil-O-Cel" | Malt extract. |
| C | Lampblack and "Sil-O-Cel" | "Goulac." |
| D | A lampblack and "Sil-O-Cel" | Animal glue. |
| E | Kaolin | Molasses. |
| F | Ground asbestos | Molasses. |

Water suspensions of these samples were made containing 2.7 grams per liter and the rates of settling were determined. The following results were obtained:

| Time | Percentage of suspended material settled out | | | | | |
|---|---|---|---|---|---|---|
| | A | B | C | D | E | F |
| *Minutes* | *Percent* | *Percent* | *Percent* | *Percent* | *Percent* | *Percent* |
| 10 | 22 | 21 | 21 | 21 | 13 | 19 |
| 20 | 34 | 45 | 46 | 45 | 30 | 28 |
| 40 | 54 | 67 | 67 | 69 | 53 | 47 |
| 60 | 68 | 77 | 77 | 77 | 66 | 62 |
| 120 | 84 | 88 | 91 | 89 | 79 | 82 |
| 150 | 91 | 91 | 94 | 92 | 83 | 88 |

*Example 3*

A sample of dry "Burgundy mixture" was prepared by adding copper sulfate solution heated to 50° C. to a solution of sodium carbonate heated to 55° C. and filtering, washing and drying the resulting precipitate. The dried material was ground to about 300 mesh size.

In the preparation of a second sample, 2.5 grams of "Sil-O-Cel" kieselguhr was added to 100 cc. of a sodium carbonate solution containing 11 grams of $Na_2CO_3$. The mixture was heated to 75° C. and 170 cc. of copper sulfate solution containing 25.5 grams of $CuSO_4$, heated to 50° C. was added with stirring. The resulting precipitate was filtered, washed and the resulting moist precipitate was thoroughly mixed with 5 grams of molasses. The resulting paste was dried at 100° C. and ground to 300 mesh size. Water suspensions of the two pulverulent products containing 7 grams per liter were made and the rate of settling was determined in each. The results are shown in the following table:

| Time | Percentage of suspended material settled out | |
|---|---|---|
| | With "Sil-O-Cel" and molasses | Without deflocculating agents |
| Minutes | Percent | Percent |
| 1 | Less than 1 | 20 |
| 4 | 20 | 90 |
| 10 | 36 | 97 |
| 20 | 44 | 100 |
| 60 | 52 | 100 |
| 120 | 56 | 100 |
| 150 | 59 | 100 |

*Example 4*

To 1 liter of water, acidified with 2 cc. of glacial acetic acid, was added 190 grams of litharge, 15 grams of "Sil-O-Cel" kieselguhr and 3 grams of lampblack which had been previously moistened with about two grams of "goulac" solution. The mixture was vigorously stirred and a solution of arsenic acid ($H_3AsO_4$) was added until precipitation was substantially complete. The precipitate was filtered off and the moist precipitate was thoroughly mixed with 12 grams of "goulac" dissolved in a small amount of water. The resulting paste was dried at 100° C. and ground to about 300 mesh. A portion of 2.7 grams of the product was suspended in one liter of water and the rate of settling was compared with a suspension of the same concentration made with a high-grade commercial lead arsenate sold for insecticide spray purposes. The results are shown in the following table:

| Time | Percentage of suspended material settled out | |
|---|---|---|
| | Product prepared as described above | Commercial product |
| Minutes | Percent | Percent |
| 1 | 20 | 20 |
| 5 | 46 | 82 |
| 10 | 55 | 92 |
| 20 | 58 | 98 |
| 40 | 63 | 99.7 |
| 60 | 67 | 100 |
| 120 | 71 | 100 |
| 150 | 74 | 100 |

The inert insoluble material which is present during the precipitation of the insecticide or fungicide in the course of my invention serves two purposes. The chief purpose, as described above, is to cause the formation of a precipitate which is more readily deflocculated by subsequent incorporation of the protective colloid. Another purpose served by the inert material is to facilitate the grinding of the dried product. For this purpose I prefer to use a material more or less fibrous or porous in nature and having a relatively low apparent specific gravity. This type of material may be illustrated by ground asbestos fibres and kieselguhr. I have found, for example, that cuprous cyanide precipitated in the absence of inert insoluble materials is difficult to grind to a fine powder, tending to form somewhat gummy masses in the grinding machine. This disadvantage is readily overcome by precipitation in the presence of the aforementioned inert materials, or by their addition after precipitation. It should be clearly understood, however, that the fibrous materials which are especially adapted to facilitate grinding also are efficient in assisting in the deflocculation of the precipitated insecticide, as described above.

The amount of inert material required will vary, depending on the nature of the inert material, its degree of fineness, and the resistance to deflocculation offered by the insecticidal material involved. For example, 1% of lampblack will give results equal to 5% of kieselguhr in the preparation of copper cyanide by my invention. In general small amounts, e. g. 0.5 to 10% of the weight of the dry insecticidal material gives the best results. Larger amounts tend to decrease the beneficial effect; I prefer to use not more than about 25% by weight of the inert material, based on the dry weight of the insecticidal material.

The amount of protective colloid material to be used in practicing my invention will vary widely, depending on the deflocculating power of the colloid used and the resistance to deflocculation of the insecticide. For example, in the preparation of the cuprous cyanide mixture in accordance with my invention, around 5% of the dry weight of the CuCN gives excellent results in the case of most protective colloids. For the deflocculation of some other insecticides, even less may be used with good results. So far as I have been able to determine, there is no upper limit to the amount of protective colloid that may be used; relatively large amounts, e. g. up to 50% by weight of the dried product, appear to give results equally good as when smaller amounts are used.

I claim:

1. A process for preparing a solid cuprous cyanide composition which is readily suspended in water to form an agricultural spray liquid which comprises precipitating cuprous cyanide in the presence of a finely divided, substantially insoluble, solid material which is substantially chemically inert to the other substances present and mixing the moist precipitate with a protective colloid.

2. A process for preparing a solid cuprous cyanide composition which is readily suspended in water to form an agricultural spray liquid which comprises precipitating cuprous cyanide in the presence of a finely divided, substantially insoluble, solid material which is substantially chemically inert to the other substances present, washing the precipitate to remove electrolytes, mixing the moist precipitate with a protective colloid and drying and grinding the resulting mixture.

3. A process for preparing a solid cuprous cyanide composition which is readily suspended in water to form an agricultural spray liquid which comprises precipitating cuprous cyanide by reacting a soluble cyanide with a solution of a cuprous salt in the presence of kieselguhr, washing the precipitate to remove electrolytes and mixing the moist precipitate with a protective colloid.

4. A process for preparing a solid cuprous cyanide composition which is readily suspended in water to form an agricultural spray liquid which comprises precipitating cuprous cyanide by reacting a soluble cyanide with a solution of a cuprous salt in the presence of finely divided asbestos, washing the precipitate to remove electrolytes and mixing the moist precipitate with a protective colloid.

5. A process for preparing a solid cuprous cyanide composition which is readily suspended in water to form an agricultural spray liquid which comprises precipitating cuprous cyanide by reacting a soluble cyanide with a solution of a cuprous salt in the presence of powdered kaolin, washing the precipitate to remove electrolytes and mixing the moist precipitate with a protective colloid.

6. A process for preparing a solid insecticidal or fungicidal composition which is readily suspended in water to form an agricultural spray liquid which comprises precipitating a relatively insoluble insecticidal or fungicidal substance from an aqueous solution in the presence of a finely divided, substantially insoluble, solid material which is substantially chemically inert to the other substances present, and mixing the moist precipitate with a protective colloid.

7. A process for preparing a solid insecticidal or fungicidal composition which is readily suspended in water to form an agricultural spray liquid which comprises precipitating a relatively insoluble insecticidal or fungicidal substance from an aqueous solution in the presence of a finely divided, substantially insoluble, solid material which is substantially chemically inert to the other substances present, washing the precipitate to remove electrolytes and mixing the moist precipitate with a protective colloid.

8. A process for preparing a solid insecticidal or fungicidal composition which is readily suspended in water to form an agricultural spray liquid which comprises precipitating a relatively insoluble insecticidal or fungicidal substance from an aqueous solution in the presence of a finely divided, substantially insoluble, solid material which is substantially chemically inert to the other substance present, mixing the moist precipitate with goulac and drying and grinding the resulting mixture.

9. An insecticidal or fungicidal composition comprising cuprous cyanide in a finely divided, highly deflocculated state intimately mixed with a finely divided, substantially insoluble, solid material and impregnated with a protective colloid.

10. An insecticidal or fungicidal composition comprising cuprous cyanide in a finely divided, highly deflocculated state intimately mixed with a finely divided, substantially insoluble, solid material and impregnated with molasses.

11. An insecticidal or fungicidal composition comprising cuprous cyanide in a finely divided, highly deflocculated state intimately mixed with a finely divided, substantially insoluble, solid material and impregnated with goulac.

12. An insecticidal or fungicidal composition comprising cuprous cyanide in a finely divided, highly deflocculated state intimately mixed with kieselguhr and impregnated with a protective colloid.

13. An insecticidal or fungicidal composition comprising cuprous cyanide in a finely divided, highly deflocculated state, intimately mixed with finely divided asbestos and impregnated with a protective colloid.

14. An insecticidal or fungicidal composition comprising cuprous cyanide in a finely divided, highly deflocculated state, intimately mixed with powdered kaolin and impregnated with a protective colloid.

15. An insecticidal or fungicidal composition comprising cuprous cyanide in a finely divided, highly deflocculated state consisting chiefly of loosely bound aggregates of small crystals impregnated with molasses and intimately mixed with kieselguhr.

CHARLES DANGELMAJER.